(12) United States Patent
Cipriani et al.

(10) Patent No.: US 10,578,771 B2
(45) Date of Patent: *Mar. 3, 2020

(54) TEMPORAL BIAS CORRECTION IN WIND FORECASTING

(71) Applicant: International Business Machines Corporation, Armonk, NY (US)

(72) Inventors: James P. Cipriani, Danbury, CT (US); Ildar Khabibrakhmanov, Syosset, NY (US); Younghun Kim, White Plains, NY (US); Anthony P. Praino, Poughquag, NY (US); Lloyd A. Treinish, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,782

(22) Filed: May 30, 2019

(65) Prior Publication Data

US 2019/0317244 A1    Oct. 17, 2019

Related U.S. Application Data

(63) Continuation of application No. 15/225,104, filed on Aug. 1, 2016, now Pat. No. 10,386,543.

(51) Int. Cl.
   *G01W 1/10* (2006.01)
(52) U.S. Cl.
   CPC ..................................... *G01W 1/10* (2013.01)

(58) Field of Classification Search
   CPC ..... G01W 1/10; G01W 1/02; G01W 2201/00; G01W 2203/00; H02J 3/386;
   (Continued)

(56) References Cited

U.S. PATENT DOCUMENTS

| 7,542,852 B1 * | 6/2009 | Rose ....................... G01W 1/02 |
| | | 702/3 |
| 8,751,432 B2 * | 6/2014 | Berg-Sonne ........... G05B 15/02 |
| | | 706/48 |

(Continued)

OTHER PUBLICATIONS

Jing et al., Bias Correction in Wind Direction Forecasting Using the Circular-Circular Regression Method (Year: 2014).*

(Continued)

*Primary Examiner* — Mohammad K Islam
(74) *Attorney, Agent, or Firm* — Garg Law Firm, PLLC; Rakesh Garg; Joseph Petrokaitis

(57) ABSTRACT

A set of characteristics of a period is extracted from a forecast that is applicable to the period and a geographical area. From a repository, a set of historical data is selected corresponding to a historical period, the set of historical data including a historical forecast related to the geographical area, and an actual measurement of wind at a location in the geographical area, the set of historical data having a subset of the set of characteristics. From the set of historical data, a function is computed to represent a discrepancy between the historical forecast and the actual measurement over the historical period. A bias value is computed from the function. By applying the bias to a value in the forecast, an adjusted forecast is produced of winds at a wind turbine located at a location in the geographical area.

20 Claims, 6 Drawing Sheets

(58) Field of Classification Search
CPC ......... F05B 2270/32; F05B 2260/8211; G06Q 10/04; G06F 17/18; F03D 7/022; F03D 7/0272; G05B 13/048; Y02A 30/12

See application file for complete search history.

(56) References Cited

U.S. PATENT DOCUMENTS

| | | | | |
|---|---|---|---|---|
| 9,702,923 | B2* | 7/2017 | Gaarder | G01R 31/086 |
| 9,915,243 | B2* | 3/2018 | Sagi | F03D 7/048 |
| 2002/0114517 | A1* | 8/2002 | Wolfson | G01S 13/86 |
| | | | | 382/181 |
| 2009/0257873 | A1* | 10/2009 | Egedal | F03D 7/022 |
| | | | | 416/1 |
| 2010/0180694 | A1* | 7/2010 | Ely, III | G01W 1/10 |
| | | | | 73/861.42 |
| 2012/0237083 | A1* | 9/2012 | Lange | G06K 9/00805 |
| | | | | 382/103 |
| 2013/0024044 | A1* | 1/2013 | Sharma | H02J 3/14 |
| | | | | 700/297 |
| 2013/0046492 | A1* | 2/2013 | Westergaard | H02J 3/00 |
| | | | | 702/60 |
| 2013/0106107 | A1* | 5/2013 | Spruce | F03D 7/0224 |
| | | | | 290/44 |
| 2013/0317748 | A1* | 11/2013 | Obrecht | F03D 7/048 |
| | | | | 702/3 |
| 2014/0012732 | A1* | 1/2014 | Lindores | A01B 79/005 |
| | | | | 705/37 |
| 2014/0018106 | A1* | 1/2014 | Fulger | G01C 21/3415 |
| | | | | 455/456.3 |
| 2014/0025354 | A1* | 1/2014 | Padullaparthi | G06N 20/00 |
| | | | | 703/2 |
| 2014/0195159 | A1* | 7/2014 | Mewes | G01W 1/02 |
| | | | | 702/3 |
| 2014/0244188 | A1* | 8/2014 | Bai | F03D 17/00 |
| | | | | 702/60 |
| 2014/0324348 | A1* | 10/2014 | Volfson | G01W 1/02 |
| | | | | 702/3 |
| 2014/0343759 | A1* | 11/2014 | Garrido-Lopez | G08G 5/0052 |
| | | | | 701/3 |
| 2014/0344209 | A1* | 11/2014 | Fang | G06N 7/005 |
| | | | | 706/52 |
| 2015/0278405 | A1* | 10/2015 | Andersen | G06F 17/5009 |
| | | | | 703/18 |
| 2016/0252015 | A1* | 9/2016 | Kusumi | F03D 9/00 |
| | | | | 290/40 B |
| 2017/0261645 | A1* | 9/2017 | Kleeman | G01W 1/10 |
| 2017/0336534 | A1* | 11/2017 | Forbes | G06F 17/10 |
| 2017/0337495 | A1* | 11/2017 | Ghosh | G06Q 10/06375 |
| 2017/0351963 | A1* | 12/2017 | Leeds | G01W 1/14 |
| 2018/0045854 | A1* | 2/2018 | Kneuper | G01W 1/10 |

OTHER PUBLICATIONS

Nlu et al., Short-Term Wind Speed Hybrid Forecasting Model Based on Bias Correcting Study and Its Application (Year: 2014).*

Bob et al., Bias Correction of MOS Temperature and Dewpoint Forecasts (Year: 2007).*

List of all IBM related applications, Appendix P, 2019.

* cited by examiner

TEMPORAL BIAS CORRECTION IN WIND FORECASTING

TECHNICAL FIELD

The present invention relates generally to a method, system, and computer program product for improving an accuracy of a weather forecast. More particularly, the present invention relates to a method, system, and computer program product for temporal bias correction in wind forecasting.

BACKGROUND

Wind energy plays a significant role in renewable power generation. Unlike fossil fuels or nuclear fuel-based power generation, which is largely independent of weather fluctuations, wind energy is highly erratic depending on the prevailing weather conditions. Accordingly, power generation from wind energy is also closely dependent on the weather conditions.

For example, wind velocity can vary significantly from one weather condition to another. Correspondingly, power generation from wind can also vary significantly from one weather condition to another.

Presently, weather forecasting depends on data collected from weather observation stations that are geographically scattered throughout a geographical region. The stations are scattered geographically to provide adequate forecasting coverage for the entire geographical region.

Wind forecast is a part of a weather forecast. Normally, a wind forecast includes a forecasted wind velocity—which includes wind speed and wind direction. In some cases, such as in aviation weather forecasts, wind forecast is specific to certain altitudes, such as designated flight levels. For example, winds may be forecasted at 12,000 feet or flight level 120, 15,00 feet or flight level 150, 33,000 feet or flight level 330, and so on.

SUMMARY

The illustrative embodiments provide a method, system, and computer program product. An embodiment includes a method that extracts, from a forecast that is applicable to a period and a geographical area, a set of characteristics of the period. The embodiment selects, from a repository, a set of historical data corresponding to a historical period, the set of historical data comprising a historical forecast related to the geographical area, and an actual measurement of wind at a location in the geographical area, the set of historical data having a subset of the set of characteristics. The embodiment computes, using a processor and a memory, from the set of historical data, a function to represent a discrepancy between the historical forecast and the actual measurement over the historical period. The embodiment computes a bias value from the function. The embodiment adjusts the forecast, using the processor and the memory, by applying the bias to a value in the forecast, to produce an adjusted forecast of winds at a wind turbine located at a location in the geographical area. Thus, the embodiment advantageously produces precise and accurate wind at the blades forecasts for wind-power generation facilities.

An embodiment further adjusts, using the adjusted forecast of winds, a power generation forecast. Thus, the embodiment produces precise and accurate power generation forecasts for wind-power generation facilities.

An embodiment further computes a time difference between the historical forecast reaching a value and the actual measurement reaching the value, wherein the function represents a curve formed by a plurality of time differences, the time difference being a member of the plurality of time differences. Thus, the embodiment advantageously produces precise and accurate wind at the blades forecasts which is time-corrected for wind conditions at a wind power generation facility location.

In one embodiment, the set of historical data comprises a plurality of pairs of historical forecast related to the geographical area and actual measurement of wind at a location in the geographical area, wherein each pair in the plurality applies to a different historical time. Thus, the embodiment advantageously produces precise and accurate wind at the blades forecasts which is time-corrected for seasonal wind conditions at a wind power generation facility location.

An embodiment further receives, from a weather forecasting service, the forecast including a wind forecast of winds during the period at the geographical area. Thus, the embodiment advantageously produces precise and accurate wind at the blades forecasts from a combined weather forecast that is applicable to a wind power generation facility location.

In one embodiment the historical forecast related to the geographical area includes a historical wind forecast, wherein the historical wind forecast is an extrapolated value that applies to the location in the geographical area, wherein a value at a second location is extrapolated to form the extrapolated value at the location. Thus, the embodiment advantageously produces precise and accurate wind at the blades forecasts from an extrapolated combined weather forecast that is a non-actual extrapolated forecast expected to be applicable to a wind power generation facility location.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
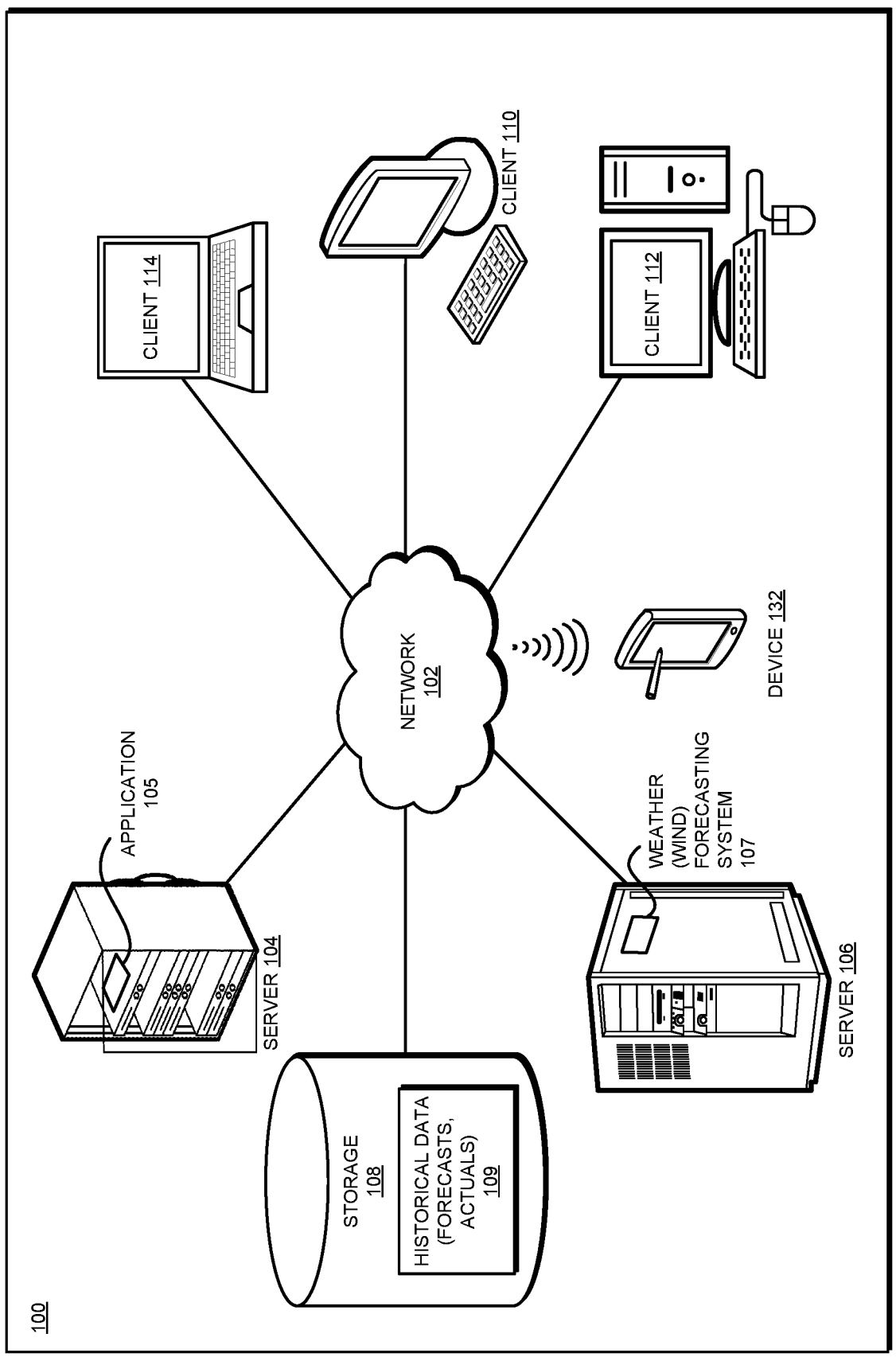
FIG. 1 depicts a block diagram of a network of data processing systems in which illustrative embodiments may be implemented.

The illustrative embodiments recognize that the presently available wind forecast is highly inaccurate for the purposes of power generation from wind energy. For example, a power generation forecast of a 3 Mega Watt (MW) wind turbine facility, which is based on the presently available wind forecast, can have an error of as much as 800 Kilo Watts (KW) over a 6-8 months' period.

The illustrative embodiments recognize that one of the reasons for the inaccuracy and the unsuitability of the presently available wind forecast for wind-power generation is that the wind data is collected at observation stations that are situated away from the power generation facilities. The distance between a station and a power generation facility gives rise to a time discrepancy between the measurement at the station and effective winds at a wind turbine blades (referred to hereinafter as "wind at the blades").

For example, assume that an observation station is located 1 mile away from a wind turbine. Wind flowing in a direction from the station towards the turbine is measured at the station several minutes before the wind arrives at the blades of the turbine. As an example, if wind is forecasted at the station at 6 miles per hour at 10:00 AM, that wind will not become wind at the blades until at least 10:10 AM. If the power generation forecast at 10:00 AM uses this wind forecast of 6 miles per hour at 10:00 AM, the actual wind at the blades may be 0 miles per hour at 10:00 AM, and the power generation forecast for 10:00 AM will be in serious error.

As another example, assume the same observation station and wind turbine 1 mile apart. Wind flowing in a direction from the turbine towards the station is measured at the station several minutes after the wind arrives at the blades of the turbine. As an example, if wind is forecasted at the station at 6 miles per hour at 10:00 AM, that wind will already have become wind at the blades at 9:50 AM. If the power generation forecast at 10:00 AM uses this wind forecast of 6 miles per hour at 10:00 AM, the actual wind at the blades may be 0 miles per hour at 10:00 AM, and the power generation forecast for 10:00 AM will again be in serious error.

The illustrative embodiments recognize that wind speed, wind direction, or both can change frequently. The frequent change can be seasonal, somewhat periodical, random, affected by other weather phenomenon such as storms moving in or out, or a combination of these and many other reasons. Thus, the illustrative embodiments recognize that a temporal discrepancy, such as the one described in the simplified example above, is actually a very complex and varying discrepancy between forecasted winds and actual winds at the blades.

Furthermore, the illustrative embodiments recognize that factors other than a lateral distance between a station and a turbine also cause the temporal discrepancy. For example, it is often desirable to place the wind turbines at some altitude above ground level. Many wind energy farms are therefore located on mountain-tops or elevated areas. In contrast, the weather forecast is most useful if collected at ground level, where people using the forecast reside. Therefore, many observation stations are located at ground level, or a level that is significantly different from the elevation of the turbine blades. The elevation difference between the elevation of the station and the elevation of the blades is often at least hundreds of feet if not thousands of feet.

It is well known that wind velocities at higher elevations are much different—usually having significantly higher speeds at higher elevations—that at lower elevations. Consider again the station and the turbine that are 1 mile apart. Further suppose that the elevation difference between the station and the blades of the turbine is 500 feet. Normally, winds forecasted at the station elevation is extrapolated using known fixed formulae to estimate winds at other elevations.

The illustrative embodiments recognize that the extrapolated winds forecast can itself be fraught with numerous types of error. For example, an extrapolation formula can itself include a tolerance, which can introduce an error.

As another example, the terrain between the station and the turbine is often not accounted for—or at least not accounted for completely accurately—in an extrapolation formula. For example, a rising terrain has a different effect on wind velocity than a flat terrain or a water body between the station and the turbine. Terrain changes can be extremely varied and it is almost impossible to exactly account for terrain-related changes in extrapolated wind forecasts.

Similarly, obstructions between the station and the turbine can also introduce errors in the wind forecasts. For example, natural or manmade structures between the station and the turbine can cause actual wind at the blade to differ significantly from a forecasted wind.

The distance, the different elevations, the terrain, the obstructions, and many other factors have an effect on the wind at the blades. Furthermore, the effect of each such factor can be distilled or reduced to a temporal discrepancy, i.e., a discrepancy or inconsistency between the forecasted wind and actual wind at the blades where the discrepancy is a function of an amount of time.

The illustrative embodiments recognize that for these and numerous other reasons, the presently available wind forecasts are inaccurate for predicting actual wind at the blades in wind-power generation. Therefore, the illustrative embodiments recognize that the presently available wind forecasts are unsuitable for producing accurate power generation forecasts.

The illustrative embodiments used to describe the invention generally address and solve the above-described problems and other problems related to the accuracy of wind forecasts for the wind at the blades in wind-power generation.

An embodiment can be implemented as a software application. The application implementing an embodiment can be configured as a modification of an existing wind or weather forecasting system, as a separate application that operates in conjunction with an existing wind or weather forecasting system, a standalone application, or some combination thereof.

An embodiment receives a wind forecast, e.g., a weather forecast including wind forecast data, for a period. The forecast is applicable to a location of a wind-power generation facility.

The embodiment determines or computes a set of period characteristics from the forecast. A period characteristic is a characteristic of feature of the period that has at least some effect on the weather forecast during the period. Some non-limiting examples of period characteristics include a value associated with-a storm condition—e.g. a severity of the storm or a velocity of the storm; a precipitation condition—e.g. an amount of the precipitation; a time of day; a day of the year; a season; a jet stream location or velocity; a periodic weather phenomenon such as el Niño or la Niña; an occasional geological event such as a category of a tsunami, hurricane, tropical depression; and many others.

An embodiment maintains a repository of historical data. Historical data includes historical forecasts—i.e., historical wind forecast data for various periods and locations, and historical actuals—i.e., actual measurements of wind at the blades for various periods and locations. As wind forecasts are made and actual wind at the blades are measured, the embodiment adds the forecasts and actuals to the repository to grow the historical data.

Using the set of characteristics of the period to which the received forecast pertains, an embodiment selects a set of historical data. The selected set of historical data has at least a subset of the period characteristics whose historical values are within a tolerance of the values of the corresponding characteristics in the set of period characteristics of the currently received forecast.

An embodiment analyzes the selected set of historical data. Particularly, the embodiment computes the differences between the historical forecasts and the historical actuals in the selected set of historical data. Using the computed differences, the embodiment computes a time function that fits a curve of computed differences.

The time function is a function or equation that has an amount of time as at least as one parameter. In one embodiment, the amount of time is a factor of a distance between the observation station and a turbine as described herein. In another embodiment, the amount of time is a factor of a difference of elevation between the observation station and a turbine blade as described herein.

Generally, the illustrative embodiments contemplate any combination of factors that can be reduced to a time value or amount of time in a manner described herein, for the purposes of computing the time function. A function fits a given curve if a curve represented by the function matches the given curve within a specified tolerance value.

An embodiment uses the time function to compute a temporal bias that should be applied to the received forecast to make the forecast accurate as to the winds at the blade at the time the wind arrives as the blades of a turbine at the wind-power generation facility. A temporal bias is a value that modifies a received wind forecast value to produce a wind at the blades forecast value. The bias is temporal because the bias value is an output of a time function.

In one embodiment, the bias is applied to one or more nodes of a neural network. The resulting biased neural network receives as input one or more forecast values corresponding to a time and place, and outputs one or more output adjusted forecast values, at least one of the outputs being a wind at the blades value at the time and the location of a turbine.

In another embodiment, the bias is applied to one or more forecast values corresponding to a time and place. The bias causes an output of one or more output adjusted forecast values, where at least one of the outputs is a corresponding input forecast value that is shifted ahead or behind in time from the time at which the input forecast value is stated to be applicable in the received forecast. The time shifted output forecast value becomes a wind at the blades value at the time and the location of a turbine.

A power generation forecast is usually made based on a received weather forecast. An embodiment uses the wind at the blades forecast to recompute or adjust a precomputed power generation forecast.

In some cases, the power generation forecast may not be precomputed from the received weather forecast. In such cases, an embodiment computes a power generation forecast using the wind at the blades forecast, which is computed as described herein.

A method of an embodiment described herein, when implemented to execute on a device or data processing system, comprises substantial advancement of the functionality of that device or data processing system in increasing the accuracy of wind forecasts for wind-power generation. For example, presently available methods for forecasting wind-power generation output depends on weather forecasts that are not precisely applicable to the time, place, and altitude of the power generation facility. An embodiment identifies a time function that fits a correction curve between historical forecasts and historical actuals for a given period for the power generation facility in question. An embodiment biases a forecast received for the period using a temporal bias computed from the time function. The biased forecast precisely applies to the time, place, altitude, and a combination of other factors applicable to the power generation facility. An embodiment further adjusts a power generation forecast using the biased forecast of the winds at the blades. This manner of temporal bias correction in wind forecasting is unavailable in the presently available methods. Thus, a substantial advancement of such devices or data processing systems by executing a method of an embodiment is in producing precise and accurate power generation forecasts for wind-power generation facilities.

The illustrative embodiments are described with respect to certain types of power generation facilities, turbines, weather data, wind data, forecasts, times, distances, altitudes, places, locations, factors, period characteristics, functions, values, biases, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
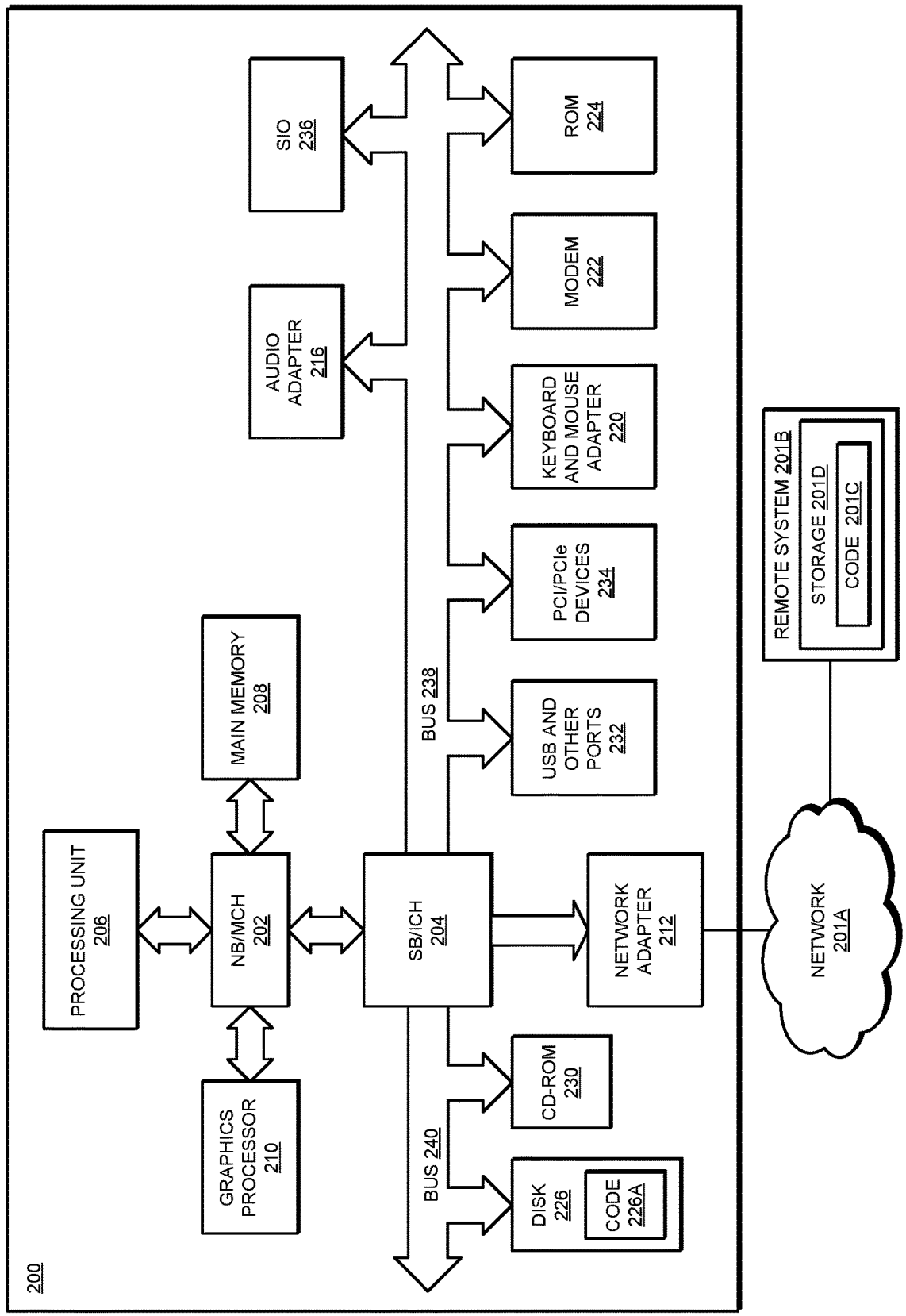
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner Any data or information stored or produced in another data processing system in FIG. 1 can be configured to be stored or produced in device 132 in a similar manner.

Application 105 implements an embodiment described herein. Weather or wind forecasting system 107 produces a presently available wind forecast. Historical data 109 includes historical forecasts and historical actuals as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
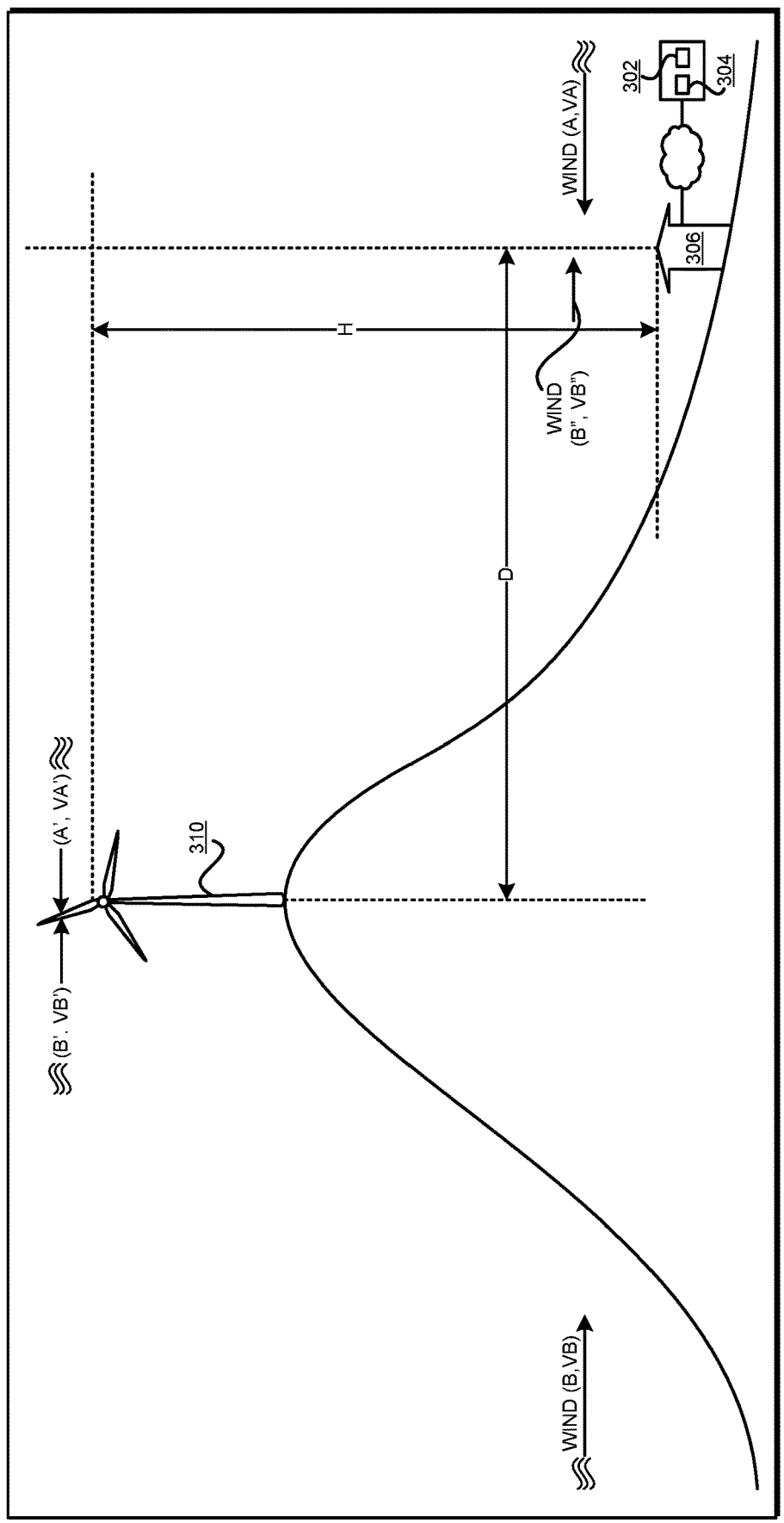
FIG. 3 depicts a block diagram of an example configuration for temporal bias correction in wind forecasting in accordance with an illustrative embodiment.

With reference to FIG. 3, this figure depicts a block diagram of an example configuration for temporal bias correction in wind forecasting in accordance with an illustrative embodiment. Application 302 is an example of application 105 in FIG. 1. System 304 is an example of forecasting system 107 in FIG. 1.

Observation station 306 is a weather observation station as described herein. Station 306 collects weather observation data and transmits the collected data to system 304 over data network 308. Data network 308 is an example of network 102 in FIG. 1.

Wind turbine 310 is an example of a turbine usable to harness wind energy for wind-power generation. Turbine 310 is situated at distance D from station 306, and at elevation H above the elevation of station 306.

Wind A has velocity VA and blows in the direction from station 306 to turbine 310. Station 306 causes the wind forecast of wind A to have velocity VA. Wind A becomes wind A' with velocity VA' upon reaching the blades of turbine 310 later than the forecasted time.

Wind B has velocity VB and blows in the direction from turbine 310 to station 306. Wind B becomes wind B' with velocity VB' upon reaching the blades of turbine 310. Wind B becomes wind B" with velocity VB" upon reaching station 306. Station 306 causes the wind forecast of wind B to have velocity VB", at a time which is after wind B' has already passed the blades of turbine 310.

Figure 4:
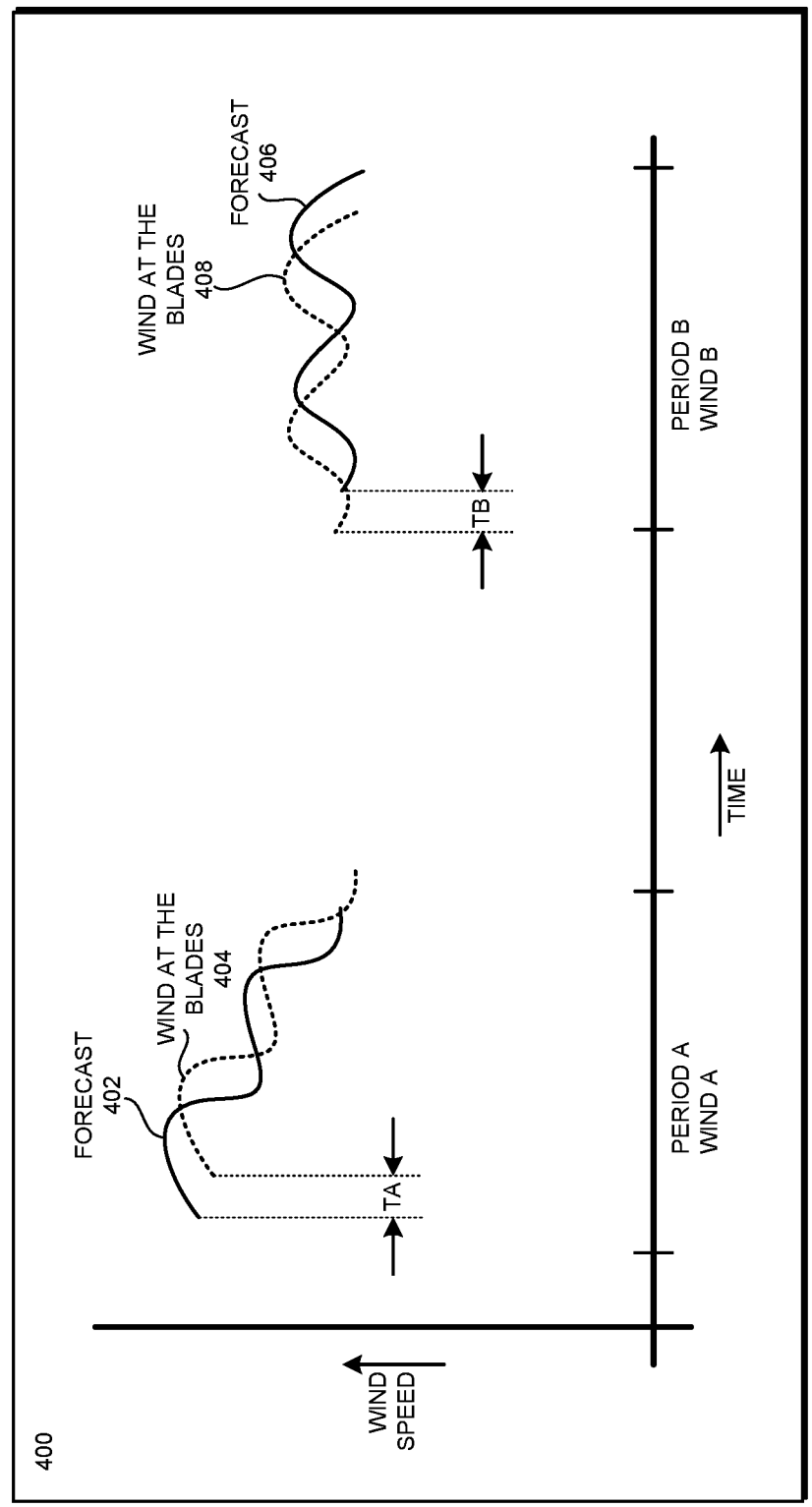
FIG. 4 depicts an example temporal discrepancy that can be remedied by an illustrative embodiment.

With reference to FIG. 4, this figure depicts an example temporal discrepancy that can be remedied by an illustrative embodiment. As a non-limiting example and only for the purposes of the clarity of the description, graph 400 shows speed and time wind forecast data plotted for two periods—A and B. Wind A in FIG. 3 flows during period A, and wind B in FIG. 3 flows during period B.

Plot 402 is a plot of the forecasted speed of wind A during period A. Plot 404 is a plot of the actual measured wind at the blades during period A. For the reasons described with respect to the arrangement depicted in FIG. 3, curve 404 corresponding to the winds at the blade lag curve 402 of the forecasted winds. For example, the lag is the amount of time TA at one time during period A.

Plot 406 is a plot of the forecasted speed of wind B during period B. Plot 408 is a plot of the actual measured wind at the blades during period B. For the reasons described with respect to the arrangement depicted in FIG. 3, curve 408 corresponding to the winds at the blade lead curve 406 of the forecasted winds. For example, the lead is the amount of time TB at one time during period B.

The depiction of FIG. 4 is intended to be conceptual and not indicative of actual plots made using real data. Accordingly, the lag can be different at different times during period A, and each of the curves 402 and 404 can look substantially different from one another according to real data at different times and under different weather conditions. Similarly, the lead can be different at different times during period B, and each of the curves 406 and 408 can look substantially different from one another according to real data at different times and under different weather conditions.

Figure 5:
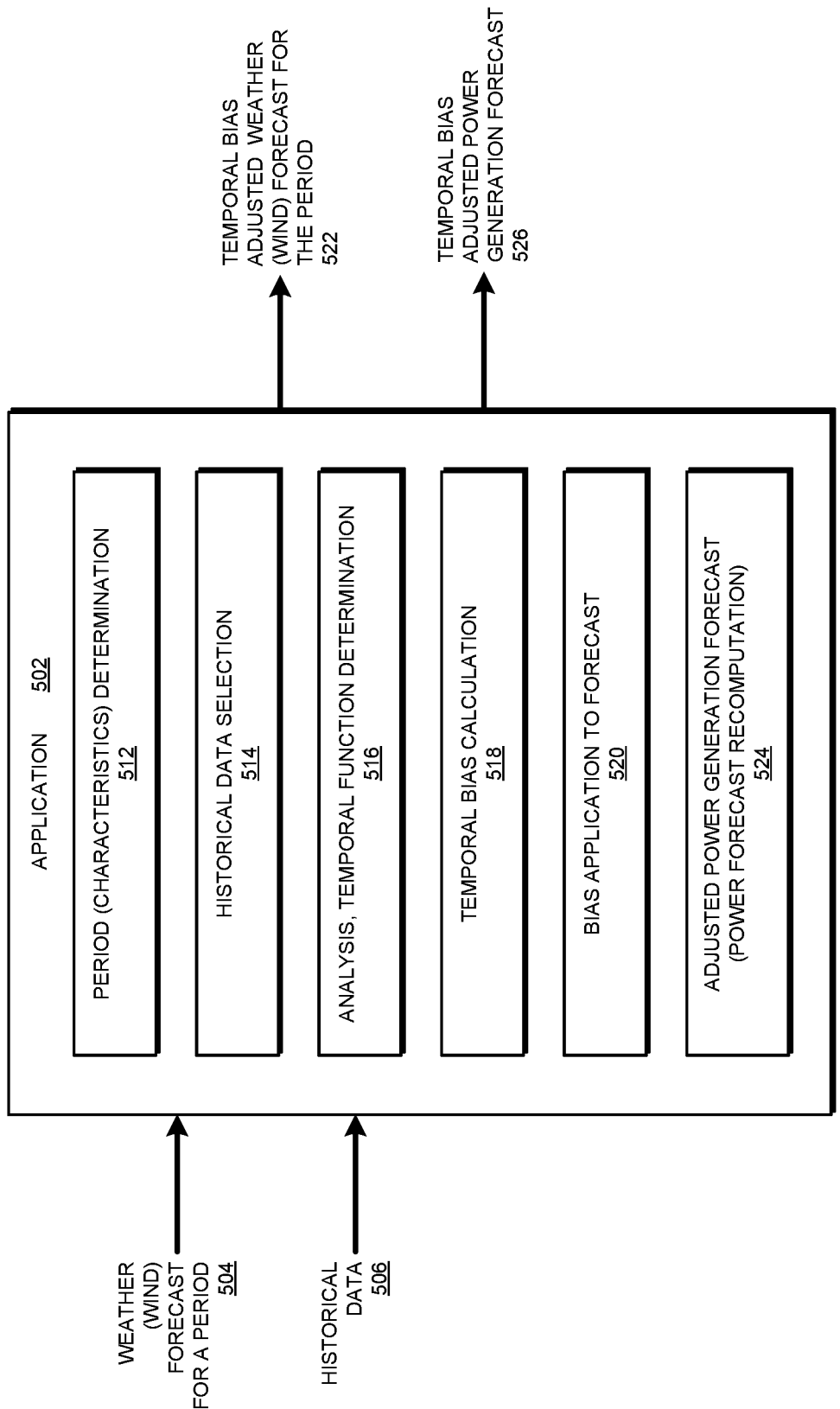
FIG. 5 depicts a block diagram of an example configuration for temporal bias correction in wind forecasting in accordance with an illustrative embodiment.

With reference to FIG. 5, this figure depicts a block diagram of an example configuration for temporal bias correction in wind forecasting in accordance with an illustrative embodiment. Application 502 is an example of application 302 in FIG. 3. Input 504 includes wind forecast for a period, e.g., the wind forecast data included in a weather forecast for the period. Input 506 is historical data, which includes historical wind forecasts and historical actuals of winds at the blades measurements.

Component 512 extracts a set of period characteristics from input 504. Using the set of period characteristics, component 514 selects a set of historical data from input 506.

Component 516 analyzes the selected set of historical data to compute a time function that applies to the temporal discrepancies in the set of historical data. Component 518 computes one or more temporal bias values using the time function.

Component 520 applies the one or more bias values to input 504. Applying the one or more bias values to forecast 504 results in temporal bias-adjusted wind forecast 522 for the period.

Component 524 computes or recomputes an adjusted power generation forecast using temporal bias-adjusted wind forecast 522. Component 524 outputs adjusted power generation forecast 526.

Figure 6:
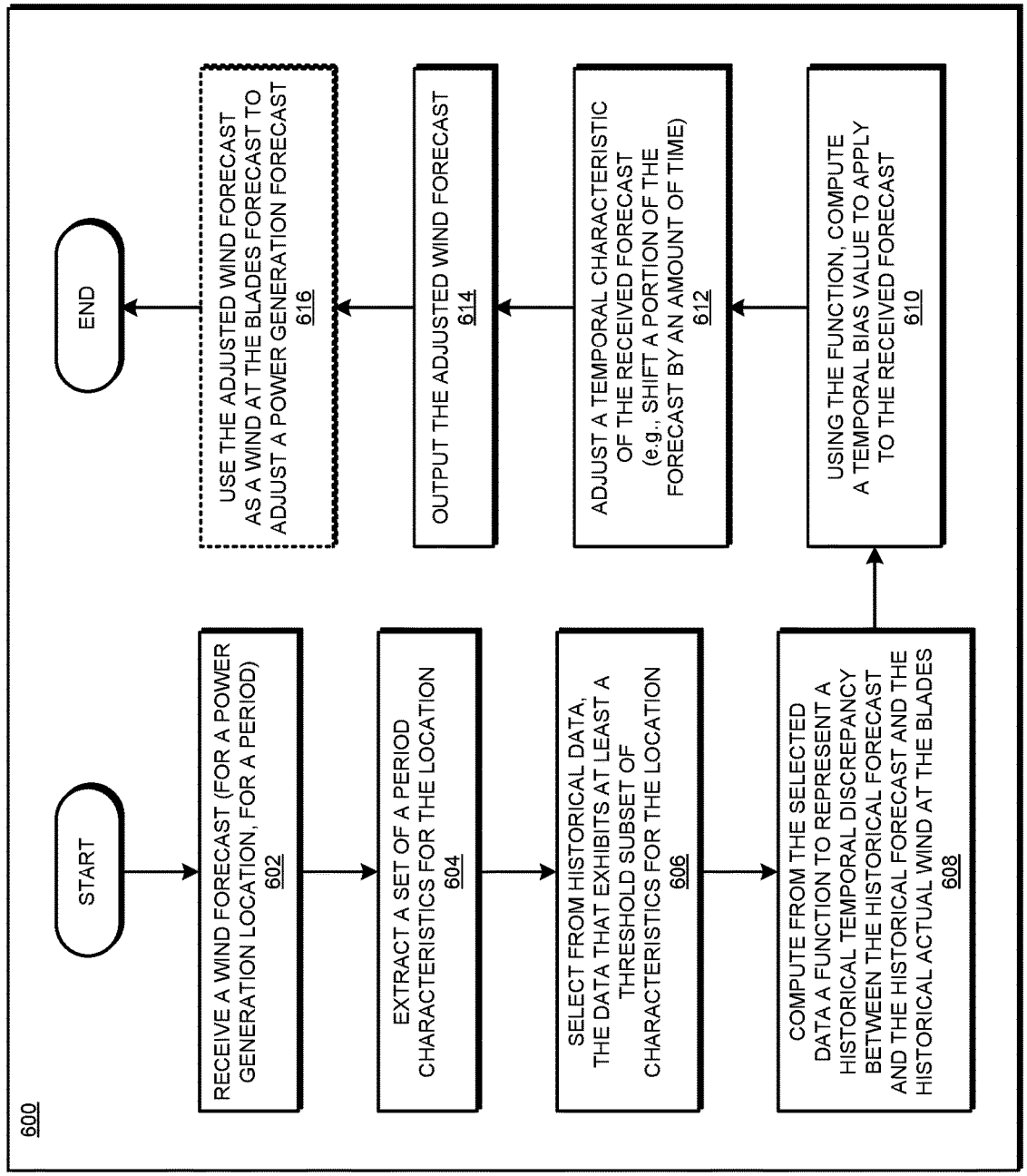
FIG. 6 depicts a flowchart of an example process for temporal bias correction in wind forecasting in accordance with an illustrative embodiment.

With reference to FIG. 6, this figure depicts a flowchart of an example process for temporal bias correction in wind forecasting in accordance with an illustrative embodiment. Process 600 can be implemented in application 502 in FIG. 5.

The application receives a wind forecast that is applicable to a wind-power generation location for a period (block 602). The application extracts a set of period characteristics for the location (block 604).

The application selects from the historical data, a set of historical data that exhibits at least a threshold subset of the characteristics for the location (block 606). In one example embodiment, the characteristics in the set of characteristics may be arranged by priority and the threshold subset may include the characteristics up to a threshold priority. In another example embodiment, the characteristics in the set of characteristics may be arranged by dependencies on one another and the threshold subset may include each of the characteristic on which a characteristic in the subset depends. In another example embodiment, the threshold subset may include a threshold number of characteristics from the set.

These example methods of matching at least a subset of the characteristics to form the threshold subset are not intended to be limiting. From this disclosure, those of ordinary skill in the art will be able to conceive many other methods of matching at least a subset of the characteristics to form the threshold subset and the same are contemplated within the scope of the illustrative embodiments.

The application computes a function to represent a temporal discrepancy between the historical forecasts and the historical actuals in the selected set of historical data (block 608). Using the function, the application computes a temporal bias value to apply to the received forecast (block 610). More than one bias values may be calculated at block 610 in a similar manner. For example, different bias values may apply to the forecast values at different times during a forecast period. As another example, the different bias values can be applied to different nodes in a neural network as described herein.

The application adjusts a temporal characteristic of the received forecast, e.g., by shifting a forecast value ahead or behind in time, or by performing one or more other operations as described herein (block 612). The application outputs the adjusted wind forecast (block 614).

The application may end process 600 thereafter, or optionally, use the adjusted wind forecast as a winds at the blades forecast to adjust a power generation forecast (block 616). The application ends process 600 thereafter.

Thus, a computer implemented method, system or apparatus, and computer program product are provided in the illustrative embodiments for temporal bias correction in wind forecasting and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of bias correction in wind forecasting, the method comprising:
    extracting, from a wind forecast that is applicable to a future period and a geographical area, a set of weather characteristics of the future period;
    selecting, from a repository, a set of historical data corresponding to a historical period, the set of historical data comprising a historical forecast related to the geographical area, and an actual measurement of wind at a location in the geographical area, the set of historical data having a subset of the set of weather characteristics;
    computing, using a processor and a memory, from the set of historical data, a time function to represent a time discrepancy between the historical forecast reaching a value of wind speed and the actual measurement reaching the value of wind speed;
    computing a bias value from the time function;
    adjusting the wind forecast, using the processor and the memory, by applying the bias to a value in the wind forecast, to produce an adjusted wind forecast of winds at a wind turbine located at a location in the geographical area.

2. The method of claim 1, further comprising:
    adjusting, using the adjusted forecast of winds, a power generation forecast.

3. The method of claim 1, further comprising:
    computing a time difference between the historical forecast reaching a value and the actual measurement reaching the value, wherein the function represents a curve formed by a plurality of time differences, the time difference being a member of the plurality of time differences.

4. The method of claim 1, wherein the set of historical data comprises a plurality of pairs of historical forecast related to the geographical area and actual measurement of wind at a location in the geographical area, wherein each pair in the plurality of historical forecast applies to a different historical time.

5. The method of claim 1, further comprising:
    receiving, from a weather forecasting service, the forecast including a wind forecast of winds during the period at the geographical area.

6. The method of claim 1, wherein the historical forecast related to the geographical area comprises:
    a historical wind forecast, wherein the historical wind forecast is an extrapolated value that applies to the location in the geographical area, wherein a value at a second location is extrapolated to form the extrapolated value at the location.

7. A computer usable program product comprising one or more computer-readable storage medium, and program instructions stored on at least one of the one or more storage medium, the stored program instructions comprising:
    program instructions to extract, from a wind forecast that is applicable to a future period and a geographical area, a set of weather characteristics of the future period;
    program instructions to select, from a repository, a set of historical data corresponding to a historical period, the set of historical data comprising a historical forecast related to the geographical area, and an actual measurement of wind at a location in the geographical area, the set of historical data having a subset of the set of weather characteristics;
    program instructions to compute from the set of historical data, a time function to represent a time discrepancy between the historical forecast reaching a value of wind speed and the actual measurement reaching the value of wind speed;
    program instructions to compute a bias value from the time function;
    program instructions to adjust the wind forecast, using the processor and the memory, by applying the bias to a value in the wind forecast, to produce an adjusted wind forecast of winds at a wind turbine located at a location in the geographical area.

8. The computer usable program product of claim 7, further comprising:
    program instructions to adjust, using the adjusted forecast of winds, a power generation forecast.

9. The computer usable program product of claim 7, further comprising:
    program instructions to compute a time difference between the historical forecast reaching a value and the actual measurement reaching the value, wherein the function represents a curve formed by a plurality of time differences, the time difference being a member of the plurality of time differences.

10. The computer usable program product of claim 7, wherein the set of historical data comprises a plurality of pairs of historical forecast related to the geographical area and actual measurement of wind at a location in the geographical area, wherein each pair in the plurality of historical forecast applies to a different historical time.

11. The computer usable program product of claim 7, further comprising:
    program instructions to receive, from a weather forecasting service, the forecast including a wind forecast of winds during the period at the geographical area.

12. The computer usable program product of claim 7, wherein the historical forecast related to the geographical area comprises:
    a historical wind forecast, wherein the historical wind forecast is an extrapolated value that applies to the location in the geographical area, wherein a value at a second location is extrapolated to form the extrapolated value at the location.

13. The computer usable program product of claim 7, wherein the computer usable code is stored in a computer readable storage medium in a data processing system, and wherein the computer usable code is transferred over a network from a remote data processing system.

14. The computer usable program product of claim 7, wherein the computer usable code is stored in a computer readable storage medium in a server data processing system, and wherein the computer usable code is downloaded over a network to a remote data processing system for use in a computer readable storage medium associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
- program instructions to extract, from a wind forecast that is applicable to a future period and a geographical area, a set of weather characteristics of the future period;
- program instructions to select, from a repository, a set of historical data corresponding to a historical period, the set of historical data comprising a historical forecast related to the geographical area, and an actual measurement of wind at a location in the geographical area, the set of historical data having a subset of the set of weather characteristics;
- program instructions to compute from the set of historical data, a time function to represent a time discrepancy between the historical forecast reaching a value of wind speed and the actual measurement reaching the value of wind speed;
- program instructions to compute a bias value from the time function;
- program instructions to adjust the wind forecast, using the processor and the memory, by applying the bias to a value in the wind forecast, to produce an adjusted wind forecast of winds at a wind turbine located at a location in the geographical area.

16. The computer system of claim 15, further comprising: program instructions to adjust, using the adjusted forecast of winds, a power generation forecast.

17. The computer system of claim 15, further comprising: program instructions to compute a time difference between the historical forecast reaching a value and the actual measurement reaching the value, wherein the function represents a curve formed by a plurality of time differences, the time difference being a member of the plurality of time differences.

18. The computer system of claim 15, wherein the set of historical data comprises a plurality of pairs of historical forecast related to the geographical area and actual measurement of wind at a location in the geographical area, wherein each pair in the plurality of historical forecast applies to a different historical time.

19. The computer system of claim 15, further comprising: program instructions to receive, from a weather forecasting service, the forecast including a wind forecast of winds during the period at the geographical area.

20. The computer system of claim 15, wherein the historical forecast related to the geographical area comprises: a historical wind forecast, wherein the historical wind forecast is an extrapolated value that applies to the location in the geographical area, wherein a value at a second location is extrapolated to form the extrapolated value at the location.

* * * * *